US012692197B1

(12) United States Patent
Luo

(10) Patent No.: US 12,692,197 B1
(45) Date of Patent: Jul. 28, 2026

(54) METHOD FOR MANUFACTURING CONDUCTIVE PARTICLES FOR CONDUCTING IONS AND ELECTRONS OF POSITIVE OR NEGATIVE ELECTRODE

(71) Applicant: Shenzhen TXD Technology Co., Ltd., Shenzhen (CN)

(72) Inventor: Zhi Feng Luo, Shenzhen (CN)

(73) Assignee: Shenzhen TXD Technology Co., Ltd, Shenzhen (CN)

( * ) Notice: Subject to any disclaimer, the term of this patent is extended or adjusted under 35 U.S.C. 154(b) by 0 days.

(21) Appl. No.: 19/080,963

(22) Filed: Mar. 17, 2025

(51) Int. Cl.
| | |
|---|---|
| *C04B 35/488* | (2006.01) |
| *C04B 35/626* | (2006.01) |
| *C04B 35/628* | (2006.01) |
| *C04B 35/634* | (2006.01) |
| *H01M 4/485* | (2010.01) |

(52) U.S. Cl.
CPC ........ *C04B 35/488* (2013.01); *C04B 35/6261* (2013.01); *C04B 35/6263* (2013.01); *C04B 35/6264* (2013.01); *C04B 35/62655* (2013.01); *C04B 35/6267* (2013.01); *C04B 35/62839* (2013.01); *C04B 35/62892* (2013.01); *C04B 35/62894* (2013.01); *C04B 35/62897* (2013.01); *C04B 35/63444* (2013.01); *H01M 4/485* (2013.01); *C04B 2235/3248* (2013.01); *C04B 2235/422* (2013.01); *C04B 2235/445* (2013.01); *C04B 2235/5436* (2013.01); *C04B 2235/5445* (2013.01); *C04B 2235/606* (2013.01); *C04B 2235/6562* (2013.01); *C04B 2235/6567* (2013.01)

(58) Field of Classification Search
None
See application file for complete search history.

(56) References Cited

U.S. PATENT DOCUMENTS

2024/0379961 A1* 11/2024 Wan ........................ C01D 15/04

\* cited by examiner

*Primary Examiner* — Michael P. Rodriguez

(57) ABSTRACT

A method for manufacturing conductive particles for conducting ions and electrons of a positive or negative electrode includes the steps of: grinding a plurality of ceramic particles and a first alcohol solution using a mill; then grinding a plurality of lithium fluoride particles, an organic material, the ceramic particles and the first alcohol solution to form a first mixed slurry using the mill; then mixing a second alcohol solution, polyvinylpyrrolidone, sodium dodecyl sulfate, a plurality of first carbon nanotubes and graphene sheets to form a second mixed slurry using a first mixer; then grinding the first and second mixed slurries using the mill; then placing the first and second mixed slurries into a rotary evaporator for removing the first and second alcohol solutions to form a mixture powder; and then performing a sintering on the mixture powder to form the conductive particles using a sintering furnace.

19 Claims, 5 Drawing Sheets

Step 500: mixing and grinding a plurality of ceramic particles 30 and a first alcohol solution 22 using a mill 100 until the ceramic particles 30 have a particle size less then 500nm.

Step 510: adding a plurality of lithium fluoride (LiF) particles 55 and an organic material 20 into the mill 100 for mixing and grinding to form a first mixed slurry 25.

Step 520: mixing a second alcohol solution 26, polyvinylpyrrolidone 27, sodium dodecyl sulfate 28, first carbon nanotubes 56 and graphene sheets 54 to form a second mixed slurry 29 by using a first mixer 150.

Step 530: placing the second mixed slurry 29 into the mill 100 and then mixing and grinding the second mixed slurry 29 and the first mixed slurry 25 by using the mill 100.

Step 540: placing the second mixed slurry 29 and the first mixed slurry 25 into a rotary evaporator 200, and then removing the first alcohol solution 22 and the second alcohol solution 26 to form a mixture powder 60 by using a rotary evaporator 200.

Step 550: placing the mixture powder 60 into a sintering furnace 250 and perform a sintering on the mixture powder 60 under a nitrogen atmosphere to form a plurality of conductive particles 40.

Step 560: mixing the conductive particles 40 and second carbon nanotubes 42 to form a plurality of composite particles 45 by using a dry mixer 300.

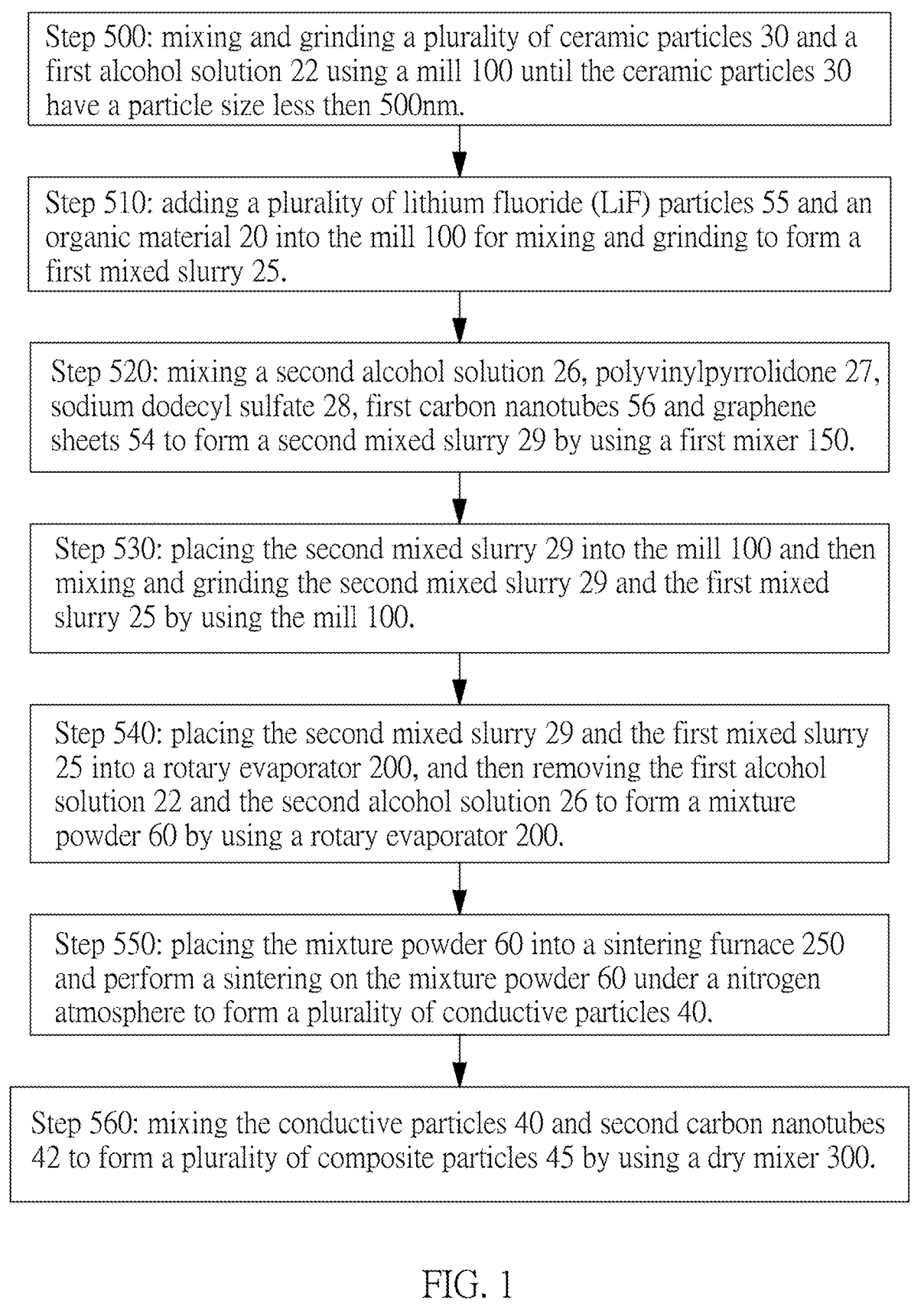

Step 500: mixing and grinding a plurality of ceramic particles 30 and a first alcohol solution 22 using a mill 100 until the ceramic particles 30 have a particle size less then 500nm.

Step 510: adding a plurality of lithium fluoride (LiF) particles 55 and an organic material 20 into the mill 100 for mixing and grinding to form a first mixed slurry 25.

Step 520: mixing a second alcohol solution 26, polyvinylpyrrolidone 27, sodium dodecyl sulfate 28, first carbon nanotubes 56 and graphene sheets 54 to form a second mixed slurry 29 by using a first mixer 150.

Step 530: placing the second mixed slurry 29 into the mill 100 and then mixing and grinding the second mixed slurry 29 and the first mixed slurry 25 by using the mill 100.

Step 540: placing the second mixed slurry 29 and the first mixed slurry 25 into a rotary evaporator 200, and then removing the first alcohol solution 22 and the second alcohol solution 26 to form a mixture powder 60 by using a rotary evaporator 200.

Step 550: placing the mixture powder 60 into a sintering furnace 250 and perform a sintering on the mixture powder 60 under a nitrogen atmosphere to form a plurality of conductive particles 40.

Step 560: mixing the conductive particles 40 and second carbon nanotubes 42 to form a plurality of composite particles 45 by using a dry mixer 300.

FIG. 1

METHOD FOR MANUFACTURING CONDUCTIVE PARTICLES FOR CONDUCTING IONS AND ELECTRONS OF POSITIVE OR NEGATIVE ELECTRODE

FIELD OF THE INVENTION

The present invention is related to battery electrode material, and in particular to a method for manufacturing conductive particles for conducting ions and electrons of a positive or negative electrode.

BACKGROUND OF THE INVENTION

A typical battery is mainly formed by the positive and negative electrodes placed in the electrolyte. In prior arts, LLZO material is added into the electrode to increase the ion conductivity. Because LLZO material has a high lithium ion conductivity, the lithium ion channels in the electrode can be dispersed by the guiding of dispersed LLZO particles when the lithium ions pass through the electrode, resulting uniformly distributed lithium ion channels in the electrode. As a result, side reactions with the electrode slurry caused by abnormal deposition of lithium ions in the electrode slurry can be avoided.

Since moisture exists during the manufacturing process of the electrode, and the LLZO particles are hydrophilic and is easy to be dampened to form an alkali. Therefore, the LLZO particle must be coated with a protective layer to prevent the LLZO particle from being dampened during the manufacturing process. In prior arts, the LLZO particle is coated with dopamine; however dopamine has a poor electrical conductivity and reduces the electrical conductivity of electrode plates.

Based on the applicant's long experience in battery materials, the present invention would like to provide a novel design to cover the outer surface of the LLZO material with a carbon layer to make it hydrophobic so that it is less likely for water to enter the LLZO material. The carbon layer can increase the overall conductivity of the electrode particles. In addition, lithium fluoride particles are also added to the carbon layer to increase ion conductivity, and carbon nanotubes also are added to enhance the conductivity of the entire electrode, which improves the problem of volume expansion of the electrode particles and results in a higher performance of the electrode.

SUMMARY OF THE INVENTION

Accordingly, for improving above mentioned defects in the prior art, the object of the present invention is to provide a method for manufacturing conductive particles for conducting ions and electrons of a positive or negative electrode, wherein an amorphous carbon layer is coated on an outer side of the ceramic particle for inhibiting an over-expansion of a volume of the conductive particle, so as to protect the conductive particle from breakage. The amorphous carbon layer has a high conductivity and increases the electrical conductivity of the conductive particle. To avoid the difficulties of lithium-ion conduction due to excessive thickness of the amorphous carbon layer, the amorphous carbon layer further includes lithium fluoride particles which are used as bridges for the lithium ion channels to obtain a better lithium-ion conductivity.

To achieve above object, the present invention provides a method for manufacturing conductive particles for conducting ions and electrons of a positive or negative electrode comprising the steps of: step A: taking a plurality of ceramic particles and a first alcohol solution and then mixing and grinding the ceramic particles and the first alcohol solution under a protection of a nitrogen atmosphere by using a mill; step B: adding a plurality of lithium fluoride (LiF) particles and an organic material into the mill; then mixing and grinding the lithium fluoride particles, the organic material, the ceramic particles and the first alcohol solution to form a first mixed slurry by using the mill; step C: taking a second alcohol solution, polyvinylpyrrolidone (PVP), sodium dodecyl sulfate (SDS), a plurality of first carbon nanotubes and a plurality of graphene sheets; and then mixing the second alcohol solution, the polyvinylpyrrolidone, the sodium dodecyl sulfate, the first carbon nanotubes and the graphene sheets to form a second mixed slurry by using a first mixer; step D: placing the second mixed slurry into the mill and then mixing and grinding the second mixed slurry and the first mixed slurry by using the mill; step E: taking out the second mixed slurry and the first mixed slurry from the mill and placing the second mixed slurry and the first mixed slurry into a rotary evaporator; and then removing the first alcohol solution and the second alcohol solution from the second mixed slurry and the first mixed slurry to form a mixture powder by using the rotary evaporator; step F: placing the mixture powder into a sintering furnace and perform a sintering on the mixture powder under a nitrogen atmosphere to form a plurality of conductive particles by using the sintering furnace; wherein each of the conductive particles includes a corresponding ceramic particle and an amorphous carbon layer coated on an outer side of the corresponding ceramic particle; the amorphous carbon layer includes a plurality of corresponding lithium fluoride particles, a plurality of corresponding graphene sheets and a plurality of corresponding first carbon nanotubes; in the sintering, a temperature of the sintering furnace is gradually increased to a specific value; the organic material, the polyvinylpyrrolidone and the sodium dodecyl sulfate in the mixture powder form a plurality of amorphous carbons; the amorphous carbon layer is formed by the amorphous carbons and is coated on an outer surface of the corresponding ceramic particle; and the lithium fluoride particles, the graphene sheets and the first carbon nanotubes are dispersed within the corresponding amorphous carbon layer; and wherein each of the graphene sheets has a sheet structure; the graphene sheets form a multilayer structure to wrap around an outer side of the corresponding ceramic particle; the first carbon nanotube are dispersed in gaps between the corresponding graphene sheets and the corresponding ceramic particle and in gaps between different graphene sheets to be used as bridges between the graphene sheets and the ceramic particle; and the lithium fluoride particles are used as bridges for guiding the lithium ions through the conductive particle.

BRIEF DESCRIPTION OF THE DRAWINGS

FIG. 1 is a steps flow diagram showing the process of the present invention.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1 to 5, the present invention provides a method for manufacturing conductive particles 40 for conducting ions and electrons of a positive or negative electrode. The conductive particle 40 is used in an electrode 10 of a solid-state or semi-solid battery.

Figure 4:
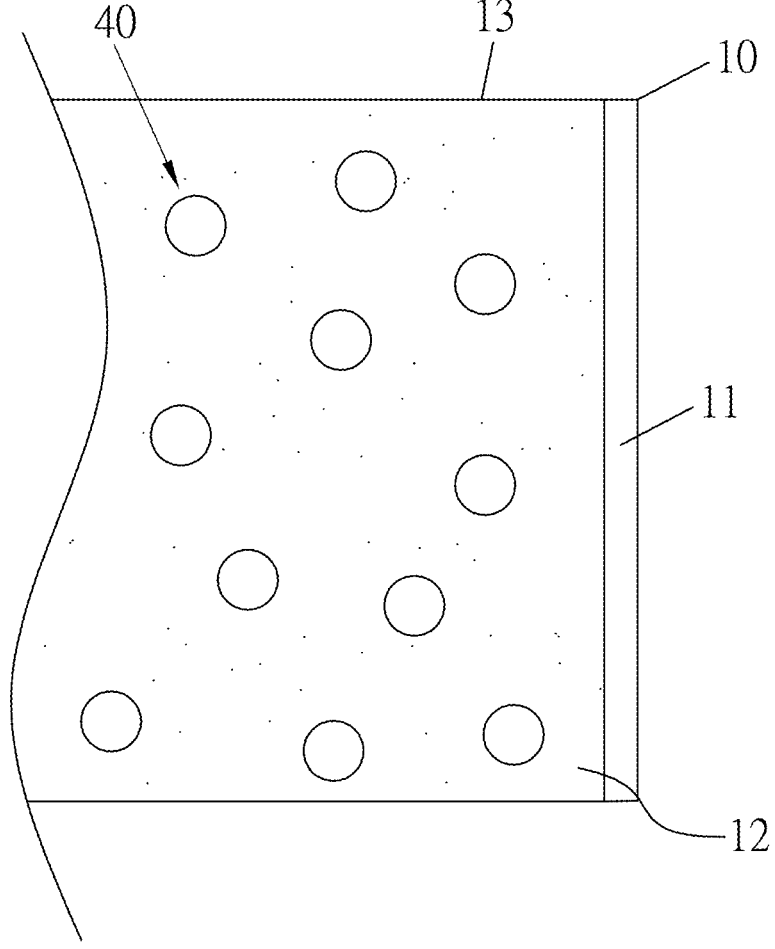
FIG. 4 is a schematic view showing an application of the present invention.

Referring to FIG. 4, the electrode 10 includes an electrode substrate 11 for carrying the material of the electrode 10, and an electrode slurry layer 13 coated on the electrode substrate 11. The electrode slurry layer 13 includes a plurality of conductive particle 40 and an electrode slurry 12 having a binder. A weight percentage of the conductive particle 40 in the electrode slurry layer 13 is 0.1 wt %~1 wt %. A particle size of each of the conductive particle 40 is less than 200 nm.

Figure 2:
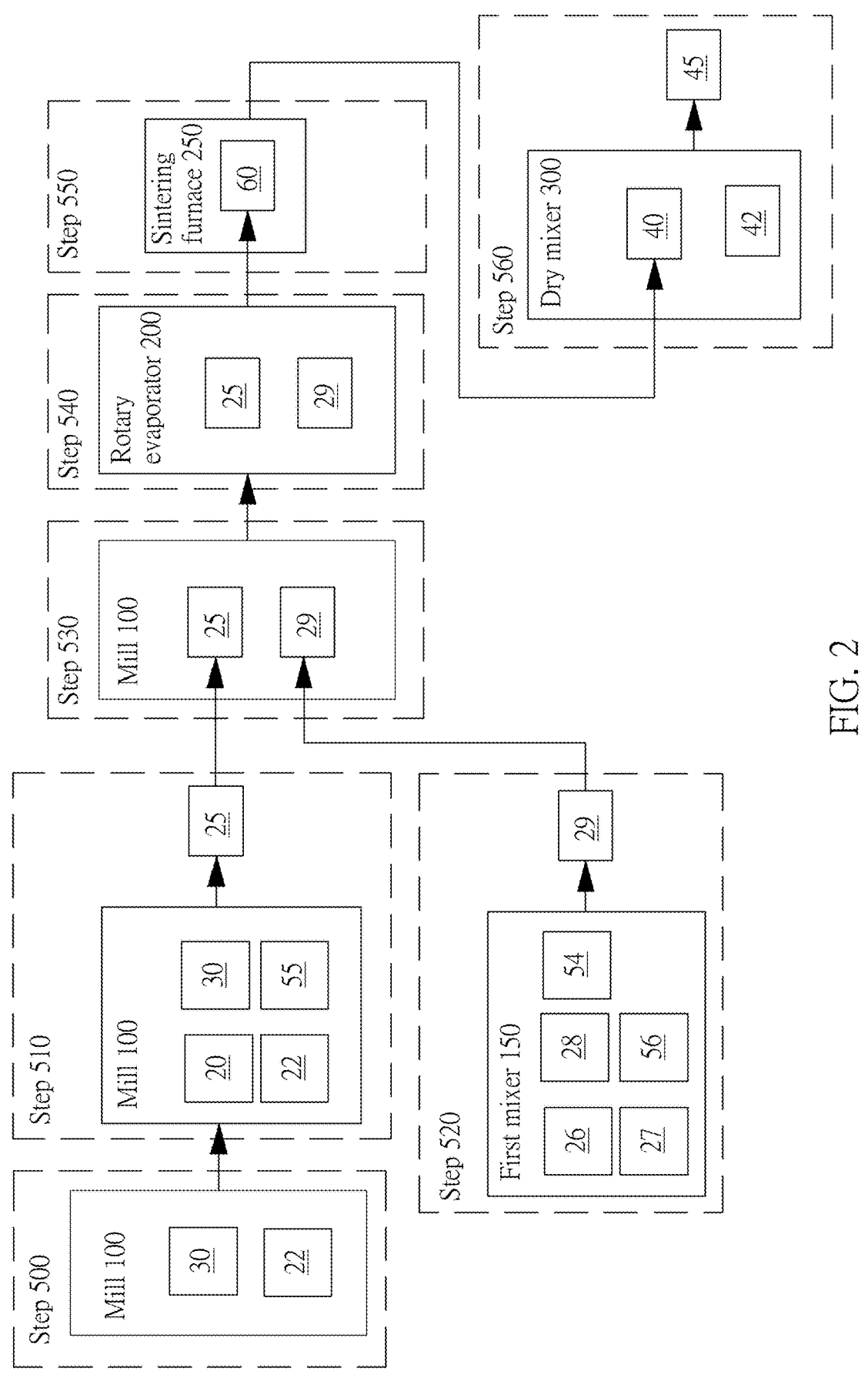
FIG. 2 is a processing schematic view showing the process of the present invention.

The method of the present invention is used to manufacture the conductive particles 40. Referring to FIGS. 1 and 2, the method comprises the following steps of:

Step 500: taking a plurality of ceramic particles 30 and a first alcohol solution 22 and then mixing and grinding the ceramic particles 30 and the first alcohol solution 22 under a protection of a nitrogen atmosphere by using a mill 100. A particle size of each of the ceramic particles 30 is less than 30 μm before the mixing and grinding of the mill 100. The particle size of each of the ceramic particles 30 is less than 500 nm after the mixing and grinding of the mill 100. A ratio of a total weight of the ceramic particles 30 and a weight of the first alcohol solution 22 is 0.1~0.15:0.9~0.85. Preferably, first alcohol solution 22 is formed by ethanol or isopropyl alcohol.

The ceramic particles 30 have a high lithium ion conductivity and serves to guiding lithium ion passing the electrode 10 to disperse lithium ion channels in the electrode 10 to cause that the electrode has uniformly distributed lithium ion channels, which avoid side reactions with an electrode slurry 12 in the electrode 10 caused by an abnormal deposition of the lithium ions in the electrode slurry 12.

Each of the ceramic particles 30 is formed by at least one of "a first ceramic oxide or phosphate capable of conducting lithium ions", "a second oxide with a garnet structure or a perovskite structure", and sulfide. A lithium ion conductivity of the first ceramic oxide or phosphate is higher than $10^{-3}$ $cm^2/s$.

The first ceramic oxide or phosphate may be LATP (lithium aluminum titanium phosphate) with a NASICON (sodium (Na) super ionic conductor) structure, LAGP (lithium aluminium germanium phosphate), or lithiophosphate ($Li_3PO_4$). The second oxide may be LLZO ($Li_7La_3Zr_2O_{12}$, lithium lanthanum zirconium oxide) or LLTO (lithium lanthanum titanium oxide). The sulfide may be LGPS (lithium germanium phosphorus sulfide). The ceramic particle 30 can be formed by combination of above materials with any ratio.

Each of the ceramic particles 30 can be formed by at least one of LLZO ($Li_7La_3Zr_2O_{12}$), Ga-LLZO (gallium-doped LLZO), Cu-LLZO (copper-doped LLZO), Ta-LLZO (tantalum-doped LLZO), Sr-LLZO (strontium-doped LLZO) and Al-LLZO (aluminum-doped LLZO).

When the ceramic particle 30 is formed by LAGP or LATP, the LAGP or LATP is selected from $Li_{1+x}Al_xA_{2-x}(PO_4)_3$ or $Li_{1+x+y}Al_xA_{2-x-y-z}M_yN_z(PO_4)_3$, wherein $0.1 \le x \le 0.8$, $0 \le y \le 0.2$, $0 \le z \le 0.2$, A is germanium (Ge) or titanium (Ti), M is trivalent cation (such as scandium cation ($Sc^{3+}$), yttrium cation ($Y^{3+}$), gallium cation ($Ga^{3+}$), indium cation ($In^{3+}$) or lanthanum cation ($La^{3+}$)), and N is tetravalent cation (such as zirconium cation ($Zr^{4+}$), silicon cation ($Si^{4+}$), or tin cation ($Sn^{4+}$)).

Step 510: adding a plurality of lithium fluoride (LiF) particles 55 and an organic material 20 into the mill 100. Then mixing and grinding the lithium fluoride particles 55, the organic material 20, the ceramic particles 30 and the first alcohol solution 22 to form a first mixed slurry 25 by using the mill 100. The first alcohol solution 22 serves to increase a viscosity and wrapping capability of the organic material 20. The first alcohol solution 22 has a lower boiling point and can be volatilized more easily for subsequent processing.

After the step 510, the particle size of each of the ceramic particles 30 is less than 150 nm. A ratio of the weight of the ceramic particles 30, a weight of the organic material 20, and the weight of the first alcohol solution 22 is 0.99:0.01:4. A ratio of the weight of the ceramic particles 30 and a total weight of the lithium fluoride particles 55 is 99.9~99.95: 0.1~0.05.

The organic material 20 is formed by at least one of an organic resin, an organic compound, a carbohydrate, a water-soluble fiber and an amino acid polymer. The organic compound is selected from carbohydrate (such as such as monosaccharide, disaccharide, oligosaccharide or polysaccharide), water-soluble fiber and amino acid polymer. Preferably, the organic compound is a carbon-contained compound having at least one of nitrogen, fluorine, phosphorus and sulfur. The nitrogen, fluorine, phosphorus and sulfur are doped to the carbon of the carbon-contained compound by a reduction reaction, which increases the electrical conductivity of the conductive particles 40.

In the steps 500 and 510, the mill 100 is a wet mill with zirconium balls. A mixing and the grinding time of the mill 100 is 2~4 hours and a rotation speed of the mill 100 is 2800 rpm±20%. A size of each of the zirconium balls is 0.1 mm. A filling ratio of the zirconium balls is 90%, which is a ratio of a total volume of the zirconium balls to a mixing volume of the mill 100.

Step 520: taking a second alcohol solution 26, polyvinylpyrrolidone (PVP) 27, sodium dodecyl sulfate (SDS) 28, a plurality of first carbon nanotubes 56 and a plurality of graphene sheets 54, and then mixing the second alcohol solution 26, the polyvinylpyrrolidone 27, the sodium dodecyl sulfate 28, the first carbon nanotubes 56 and the graphene sheets 54 to form a second mixed slurry 29 by using a first mixer 150.

A ratio of the total weight of the ceramic particles 30 and a total weight of the first carbon nanotubes 56 and the graphene sheets 54 is 99.5:0.5. A ratio of a total weight of the graphene sheets 54 and a total weight of the first carbon nanotubes 56 is 4:1. A ratio of a weight of the polyvinylpyrrolidone 27 and a weight of the sodium dodecyl sulfate 28 is 3:1. A weight percentage of "a solid material formed by the polyvinylpyrrolidone 27, the sodium dodecyl sulfate 28, the graphene sheets 54 and the first carbon nanotubes 56" in the second mixed slurry 29 is 5 wt %~20 wt %.

Each of the graphene sheets 54 is a few-layer graphene (FLG) having 2~10 graphene layers. A size of each of the graphene sheets 54 is less than 500 nm. Each of the first carbon nanotubes 56 has a length less than 1 μm.

The first alcohol solution 22 and the second alcohol solution 26 may be a same alcohol solution or different alcohol solutions.

Step 530: placing the second mixed slurry 29 into the mill 100 and then mixing and grinding the second mixed slurry 29 and the first mixed slurry 25 under the protection of the nitrogen atmosphere by using the mill 100. A mixing and grinding time of the mill 100 is 2~4 hours. The rotation speed, size of each of the zirconium balls and the filling ratio of the zirconium balls of the mill 100 are identical to those of the steps 500 and 510.

Step 540: taking out the second mixed slurry 29 and the first mixed slurry 25 from the mill 100 and placing the second mixed slurry 29 and the first mixed slurry 25 into a rotary evaporator 200, and then removing the first alcohol solution 22 and the second alcohol solution 26 from the second mixed slurry 29 and the first mixed slurry 25 to form a mixture powder 60 by using the rotary evaporator 200.

Figure 3:
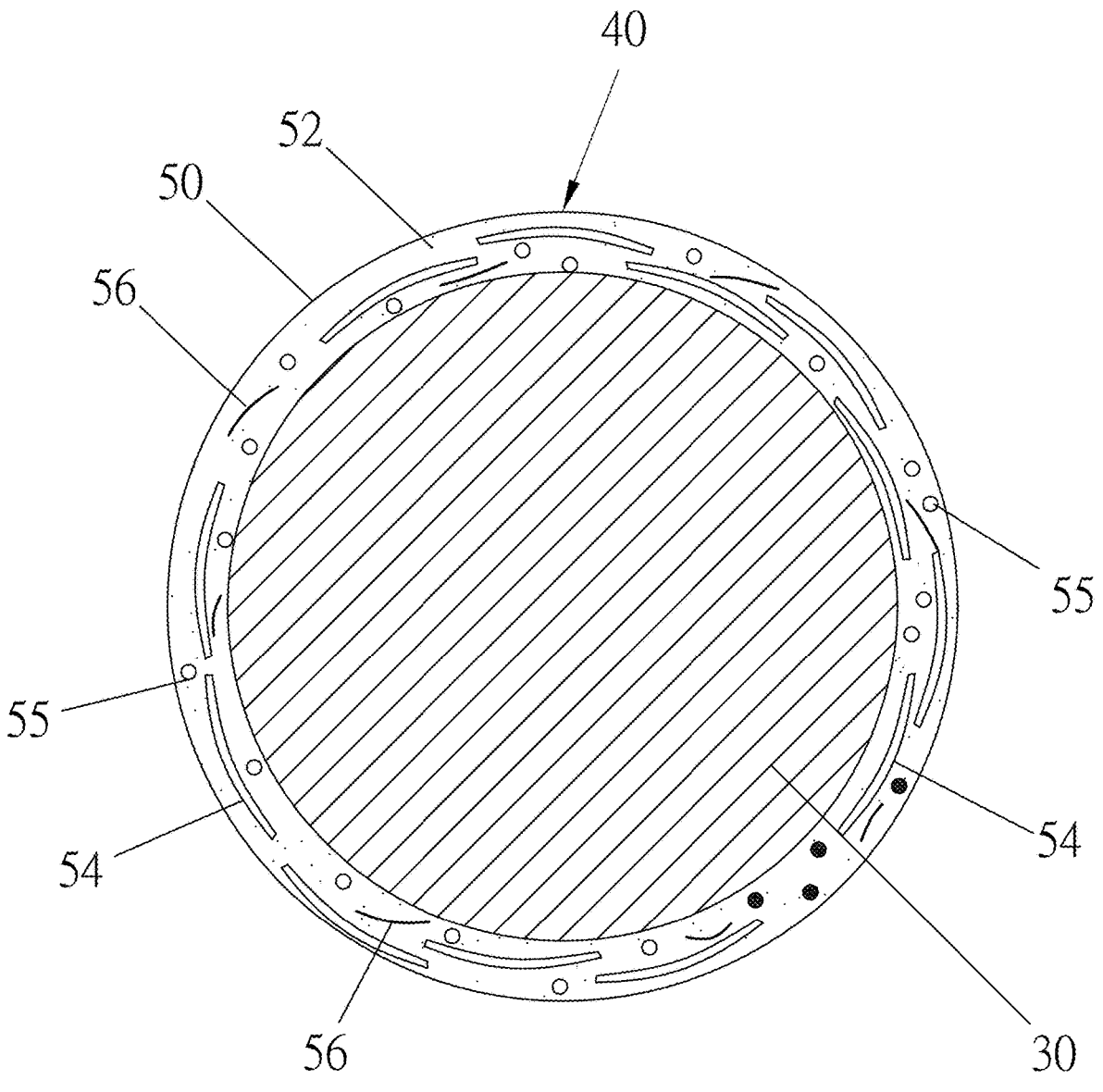
FIG. 3 is a cross-section view showing the structure of the conductive particle of the present invention.

Step 550: placing the mixture powder 60 into a sintering furnace 250 and perform a sintering on the mixture powder 60 under a nitrogen atmosphere to form a plurality of conductive particles 40 by using the sintering furnace 250. In the sintering, a temperature of the sintering furnace 250 is gradually increased to a specific value. The sintering is performed by increasing the temperature of the sintering furnace 250 to a first sintering temperature of 180° C. at a raising rate of 5° C./minute and holding the first sintering temperature for 1 hour, and then increasing the first sintering temperature to a second sintering temperature of 280° C. at the raising rate and holding the second sintering temperature for 3 hours, and then increasing the second sintering temperature to a third sintering temperature of 600° C. at the raising rate and holding the third sintering temperature for 4 hours. Each of the conductive particles 40 includes a corresponding ceramic particle 30 and an amorphous carbon layer 50 coated on an outer side of the corresponding ceramic particle 30. The amorphous carbon layer 50 includes a plurality of corresponding lithium fluoride particles 55, a plurality of corresponding graphene sheets 54 and a plurality of corresponding first carbon nanotubes 56 (as shown in FIG. 3).

The sintering of the step 550 is an oxygen-free sintering under the nitrogen atmosphere, which is a nitrogen atmosphere sintering. In the sintering of the step 550, the organic material 20, the polyvinylpyrrolidone 27 and the sodium dodecyl sulfate 28 in the mixture powder 60 form a plurality of amorphous carbons. The amorphous carbon layer 50 is formed by the amorphous carbons and is coated on an outer surface of the corresponding ceramic particle 30. The lithium fluoride particles 55, the graphene sheets 54 and the first carbon nanotubes 56 are dispersed within the amorphous carbon layer 50. The amorphous carbon layer 50 has a high conductivity to increase the electrical conductivity of the conductive particle 40. In each of the conductive particles 40, the particle size of the corresponding ceramic particle 30 is less than 150 nm; a radial thickness of the amorphous carbon layer 50 is less than 10 nm; and a particle size of each of the corresponding lithium fluoride particles 55 is less than 5 nm. A particle size of each of the conductive particle 40 is less than 200 nm.

In the sintering of the organic material 20, the amorphous carbons is formed by dehydration, de-esterification or a reduction atmosphere, wherein:

(i) when the organic material 20 is formed by the organic resin, the amorphous carbons are hard carbons or soft carbons formed by a de-esterification of the organic material 20 in the sintering of the step 550.

(ii) when the organic material 20 is formed by the organic compound, the amorphous carbons are formed under the reduction atmosphere in the sintering of the organic material 20 in the step 550, or are hard carbons or soft carbons formed by a de-esterification of the organic material 20 in the sintering of the step 550.

(iii) when the organic material 20 is formed by the carbohydrate, the amorphous carbons are formed by a dehydration of the organic material 20 in the sintering of the step 550.

(iv) when the organic material 20 is formed by the water-soluble fiber, the amorphous carbons are formed by a dehydration of the organic material 20 in the sintering of the step 550 and have carbon skeletons and functional groups.

(v) when the organic material 20 is formed by the amino acid polymer, the amorphous carbons are formed by a dehydration of the organic material 20 in the sintering of the step 550 and have carbon skeletons with straight chains or side chains containing doping elements.

Each of the graphene sheets 54 has a sheet structure. The graphene sheets 54 form a multilayer structure to wrap around an outer side of the corresponding ceramic particle 30. The first carbon nanotube 56 are dispersed in gaps between the corresponding graphene sheets 54 and the corresponding ceramic particle 30 and in gaps between different graphene sheets 54 to be used as bridges between the graphene sheets 54 and the ceramic particle 30, which increases the conductivity of the corresponding conductive particle 40.

Since the efficiency of passage of the lithium ions through the conductive particle 40 is affected by the thickness of the amorphous carbon layer 50, the lithium fluoride particles 55 can be used as bridges for guiding the lithium ions through the conductive particle 40.

Figure 5:
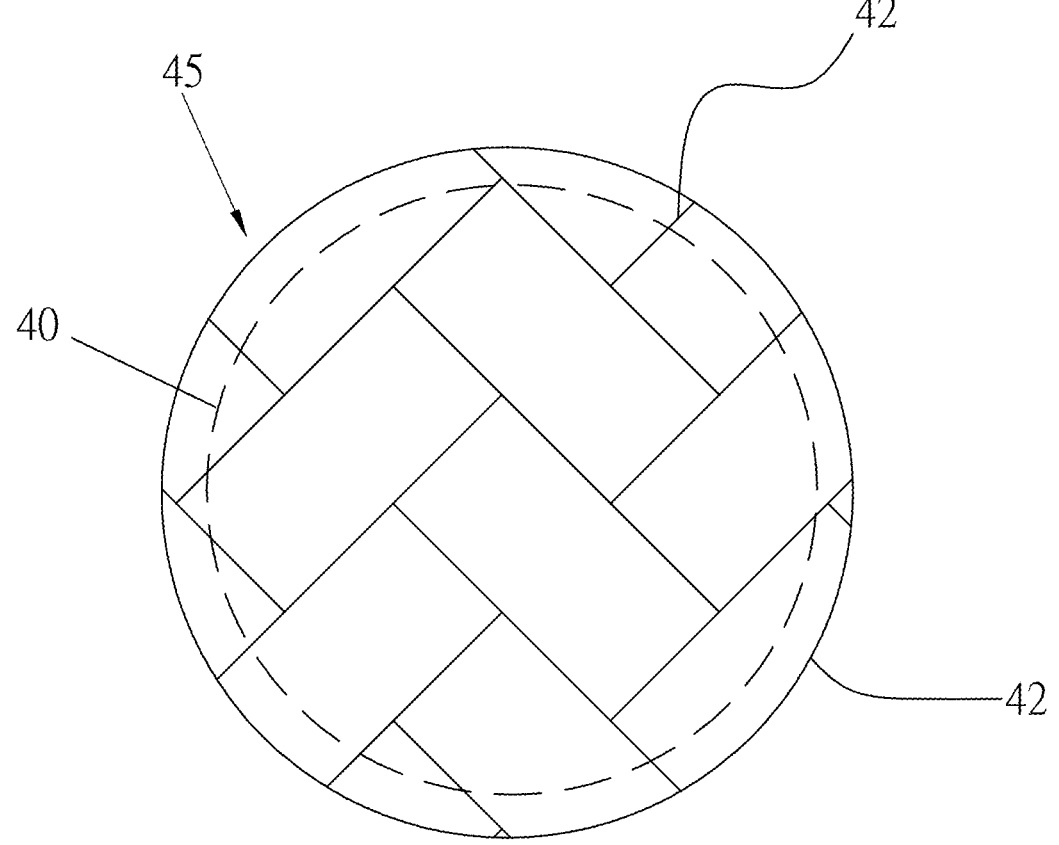
FIG. 5 is a schematic view showing the composite particle of the present invention.

Referring to FIG. 1, the method of the present invention further comprises the following step of:

Step 560: placing the conductive particles 40 and a plurality of second carbon nanotubes (CNT) 42 into a dry mixer 300 and then mixing the conductive particles 40 and the second carbon nanotubes 42 to form a plurality of composite particles 45 by using the dry mixer 300. Each of the composite particles 45 includes a corresponding conductive particle 40 and a plurality of corresponding second carbon nanotubes 42 wrapping on an outer side of the corresponding conductive particle 40 (as shown in FIG. 5). Each of the composite particles 45 has a length of 1~3 μm. In each of the composite particles 45, a ratio of a total weight of the corresponding second carbon nanotubes 42 and a weight of the corresponding conductive particle 40 is 1:99 to 0.2:99.8.

Carbon nanotubes have a high conductivity. The composite particle 45 has a yarn-ball-like structure. The second carbon nanotubes 42 serve to enhance the electrical conductivity to cause that the electrons can be conducted on the conductive particle 40. The second carbon nanotubes 42 further serve to conducting the lithium ions to cause that the lithium ions can be conducted between different conductive particles 40 in the electrode 10, which increases the electrical conductivity and ion conductivity of the electrode 10.

The advantages of the present invention are that an amorphous carbon layer is coated on an outer side of the ceramic particle for inhibiting an over-expansion of a volume of the conductive particle, so as to protect the conductive particle from breakage. The amorphous carbon layer has a high conductivity and increases the electrical conductivity of the conductive particle. To avoid the difficulties of lithium-ion conduction due to excessive thickness of the amorphous carbon layer, the amorphous carbon layer further includes lithium fluoride particles which are used as bridges for the lithium ion channels to obtain a better lithium-ion conductivity.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for manufacturing conductive particles for conducting ions and electrons of a positive or negative electrode comprising the steps of:

step 500: mixing and grinding a plurality of ceramic particles and a first alcohol solution under a protection of a nitrogen atmosphere by using a mill;

step 510: adding a plurality of lithium fluoride (LiF) particles and an organic material into the mill; then mixing and grinding the lithium fluoride particles, the organic material, the ceramic particles and the first alcohol solution to form a first mixed slurry by using the mill;

step 520: mixing a second alcohol solution, polyvinylpyrrolidone, sodium dodecyl sulfate, a plurality of first carbon nanotubes and a plurality of graphene sheets to form a second mixed slurry by using a first mixer;

step 530: placing the second mixed slurry into the mill and then mixing and grinding the second mixed slurry and the first mixed slurry by using the mill;

step 540: placing the second mixed slurry and the first mixed slurry into a rotary evaporator; and then removing the first alcohol solution and the second alcohol solution from the second mixed slurry and the first mixed slurry to form a mixture powder by using the rotary evaporator;

step 550: placing the mixture powder into a sintering furnace and perform a sintering on the mixture powder under a nitrogen atmosphere to form a plurality of conductive particles by using the sintering furnace; wherein each of the conductive particles includes a corresponding ceramic particle and an amorphous carbon layer coated on an outer side of the corresponding ceramic particle; the amorphous carbon layer includes a plurality of corresponding lithium fluoride particles, a plurality of corresponding graphene sheets and a plurality of corresponding first carbon nanotubes; in the sintering, a temperature of the sintering furnace is gradually increased to a specific value; the organic material, the polyvinylpyrrolidone and the sodium dodecyl sulfate in the mixture powder form a plurality of amorphous carbons; the amorphous carbon layer is formed by the amorphous carbons and is coated on an outer surface of the corresponding ceramic particle; and the lithium fluoride particles, the graphene sheets and the first carbon nanotubes are dispersed within the corresponding amorphous carbon layer; and wherein each of the graphene sheets has a sheet structure; the graphene sheets form a multilayer structure to wrap around an outer side of the corresponding ceramic particle; the first carbon nanotube are dispersed in gaps between the corresponding graphene sheets and the corresponding ceramic particle and in gaps between different graphene sheets to be used as bridges between the graphene sheets and the ceramic particle; and the lithium fluoride particles are used as bridges for guiding the lithium ions through the conductive particle.

2. The method as claimed in claim 1, wherein each of the ceramic particles is formed by at least one of a first ceramic oxide or phosphate capable of conducting lithium ions, a second oxide with a garnet structure or a perovskite structure, and sulfide; and a lithium ion conductivity of the first ceramic oxide or phosphate is higher than $10^{-3}$ cm$^2$/s.

3. The method as claimed in claim 2, wherein the second oxide is selected from LLZO (Li$_7$La$_3$Zr$_2$O$_{12}$, lithium lanthanum zirconium oxide) and LLTO (lithium lanthanum titanium oxide).

4. The method as claimed in claim 1, wherein each of the ceramic particles is formed by LLZO (Li$_7$La$_3$Zr$_2$O$_{12}$).

5. The method as claimed in claim 1, wherein each of the ceramic particles is formed by at least one of LLZO (Li$_7$La$_3$Zr$_2$O$_{12}$), Ga-LLZO (gallium-doped LLZO), Cu-LLZO (copper-doped LLZO), Ta-LLZO (tantalum-doped LLZO), Sr-LLZO (strontium-doped LLZO) and Al-LLZO (aluminum-doped LLZO).

6. The method as claimed in claim 1, wherein a particle size of each of the ceramic particles is less than 30 μm before the mixing and grinding of the mill in the step A; and the particle size of each of the ceramic particles is less than 500 nm after the mixing and grinding of the mill in the step A.

7. The method as claimed in claim 1, wherein the first alcohol solution is formed by ethanol or isopropyl alcohol; and the second alcohol solution is formed by ethanol or isopropyl alcohol.

8. The method as claimed in claim 1, wherein after the step B, the particle size of each of the ceramic particles is less than 150 nm; a ratio of a total weight of the ceramic particles, a weight of the organic material, and the weight of the first alcohol solution is 0.99:0.01:4; a ratio of the total weight of the ceramic particles and a total weight of the lithium fluoride particles is 99.9~99.95:0.1~0.05.

9. The method as claimed in claim 1, wherein the organic material is formed by at least one of an organic resin, an organic compound, a carbohydrate, a water-soluble fiber and an amino acid polymer;

wherein when the organic material is formed by the organic resin, the amorphous carbons are hard carbons or soft carbons formed by a de-esterification of the organic material in the sintering of the step F;

wherein when the organic material is formed by the organic compound, the amorphous carbons are formed under the reduction atmosphere in the sintering of the organic material in the step F, or are hard carbons or soft carbons formed by a de-esterification of the organic material in the sintering of the step F;

wherein when the organic material is formed by the carbohydrate, the amorphous carbons are formed by a dehydration of the organic material in the sintering of the step F;

wherein when the organic material is formed by the water-soluble fiber, the amorphous carbons are formed by a dehydration of the organic material in the sintering of the step F and have carbon skeletons and functional groups; and wherein when the organic material is formed by the amino acid polymer, the amorphous carbons are formed by a dehydration of the organic material in the sintering of the step F and have carbon skeletons with straight chains or side chains containing doping elements.

10. The method as claimed in claim 9, wherein the organic compound is selected from monosaccharide, disaccharide, oligosaccharide, polysaccharide, water-soluble fiber and amino acid polymer.

11. The method as claimed in claim 9, wherein the organic compound is a carbon-containing compound comprising at least one of nitrogen, fluorine, phosphorus and sulfur.

12. The method as claimed in claim 10, wherein the mill is a wet mill with zirconium balls; a size of each of the zirconium balls is 0.1 mm; a filling ratio of the zirconium balls is 90%, which is a ratio of a total volume of the zirconium balls to a mixing volume of the mill; and in the steps A and B, a mixing and the grinding time of the mill is 2~4 hours and a rotation speed of the mill is 2800 rpm±20%.

13. The method as claimed in claim 1, wherein in the step C, a ratio of a total weight of the ceramic particles and a total weight of the first carbon nanotubes and the graphene sheets is 99.5:0.5; a ratio of a total weight of the graphene sheets and a total weight of the first carbon nanotubes is 4:1; a ratio of a weight of the polyvinylpyrrolidone and a weight of the sodium dodecyl sulfate is 3:1; and a weight percentage of a solid material formed by the polyvinylpyrrolidone, the sodium dodecyl sulfate, the graphene sheets and the first carbon nanotubes in the second mixed slurry is 5 wt %~20 wt %.

14. The method as claimed in claim 1, wherein each of the graphene sheets is a few-layer graphene (FLG) comprising 2~10 graphene layers; a size of each of the graphene sheets is less than 500 nm; and each of the first carbon nanotubes has a length less than 1 μm.

15. The method as claimed in claim 12, wherein in the step D, the second mixed slurry and the first mixed slurry are mixed and grinded under the protection of the nitrogen atmosphere by using the mill at the same grinding time and the same rotation speed as in the step B.

16. The method as claimed in claim 1, wherein the sintering of the step F is performed by increasing the temperature of the sintering furnace to a first sintering temperature of 180° C. at a raising rate of 5° C./minute and holding the first sintering temperature for 1 hour, and then increasing the first sintering temperature to a second sintering temperature of 280° C. at the raising rate and holding the second sintering temperature for 3 hours, and then increasing the second sintering temperature to a third sintering temperature of 600° C. at the raising rate and holding the third sintering temperature for 4 hours.

17. The method as claimed in claim 1, wherein in each of the conductive particles, a radial thickness of the amorphous carbon layer is less than 10 nm; and a particle size of each of the corresponding lithium fluoride particles is less than 5 nm.

18. The method as claimed in claim 1, further comprising the following step of:

> step G: placing the conductive particles and a plurality of second carbon nanotubes (CNT) into a dry mixer and then mixing the conductive particles and the second carbon nanotubes to form a plurality of composite particles by using the dry mixer; wherein each of the composite particles includes a corresponding conductive particle and a plurality of corresponding second carbon nanotubes wrapping on an outer side of the corresponding conductive particle.

19. The method as claimed in claim 18, wherein each of the composite particles has a length of 1~3 μm; and in each of the composite particles, a ratio of a total weight of the corresponding second carbon nanotubes and a weight of the corresponding conductive particle is 1:99 to 0.2:99.8.

* * * * *